United States Patent
Sankararaman

(10) Patent No.: US 12,236,325 B2
(45) Date of Patent: Feb. 25, 2025

(54) CONTEXTUAL BANDIT FOR MULTIPLE MACHINE LEARNING MODELS FOR CONTENT DELIVERY

(71) Applicant: Intuit Inc., Mountain View, CA (US)

(72) Inventor: Shankar Sankararaman, Burlingame, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/348,052

(22) Filed: Jul. 6, 2023

(65) Prior Publication Data
US 2025/0013914 A1    Jan. 9, 2025

(51) Int. Cl.
| | |
|---|---|
| G06Q 30/02 | (2023.01) |
| G06N 3/006 | (2023.01) |
| G06N 3/082 | (2023.01) |
| G06N 5/04 | (2023.01) |
| G06N 20/00 | (2019.01) |

(52) U.S. Cl.
CPC ................... *G06N 20/00* (2019.01)

(58) Field of Classification Search
CPC .............. G06N 20/00; G06N 3/006
USPC ........................................................ 706/13
See application file for complete search history.

(56) References Cited

U.S. PATENT DOCUMENTS

| | | | |
|---|---|---|---|
| 10,430,825 B2* | 10/2019 | Chaudhuri | H04L 67/535 |
| 10,979,369 B1* | 4/2021 | Kulkarni | H04L 51/02 |
| 11,113,745 B1 | 9/2021 | Cetintas et al. | |
| 11,410,653 B1* | 8/2022 | Mahar | G10L 15/183 |
| 11,435,873 B1* | 9/2022 | Sharma | G06F 16/9538 |
| 2012/0016642 A1* | 1/2012 | Li | G06Q 30/02 703/2 |
| 2015/0140527 A1* | 5/2015 | Gilad-Barach | G09B 5/00 434/236 |
| 2017/0111505 A1 | 4/2017 | McGann et al. | |
| 2020/0012681 A1* | 1/2020 | McInerney | G06F 16/639 |
| 2020/0125586 A1* | 4/2020 | Rezaeian | G06F 3/048 |
| 2020/0250575 A1* | 8/2020 | Ie | G06N 5/043 |
| 2020/0265451 A1* | 8/2020 | McKinlay | G06Q 30/0211 |
| 2021/0097350 A1* | 4/2021 | Theocharous | G06N 5/04 |

(Continued)

OTHER PUBLICATIONS

Foster, Dylan J. et al, "Practical Contextual Bandits with Regression Oracles," arXiv:1803.01088v1 [cs.LG] Mar. 3, 2018, 35 pages.

(Continued)

*Primary Examiner* — Brandon S Cole
(74) *Attorney, Agent, or Firm* — Paradice & Li LLP

(57) ABSTRACT

A processor may receive user information for a request payload from an external device and data describing a plurality of user interface (UI) elements configured to be presented in a UI of the external device. The processor may select a machine learning (ML) model from a plurality of ML models using a contextual bandit ML model that is trained based on the user information. The processor determines at least one recommended user interface (UI) element with a selected ML model, based on the user information and the data describing the plurality of UI elements. The at least one recommended UI element may be presented in the UI of the external device. The processor may receive event data indicating a user interaction with the at least one recommended UI element in the UI of the external device. The contextual bandit ML model may be re-trained based on the event data.

20 Claims, 9 Drawing Sheets

(56) References Cited

U.S. PATENT DOCUMENTS

2022/0351070 A1* 11/2022 Liu .................. G06N 3/006
2022/0415472 A1* 12/2022 Hakala ............. G06N 20/00
2023/0308425 A1*  9/2023 Singh .............. H04L 63/08
                                                    726/6

OTHER PUBLICATIONS

Krishnamurthy, Akshay, "Lecture 4: Contextual Bandits," https://people.cs.umass.edu/~akshay/courses/coms6998-11/files/lec4.pdf, Feb. 14, 2022, 6 pages.

Li, Lihong et al, "A Contextual-Bandit Approach to Personalized News Article Recommendation," https://doi.org/10.1145/1772690.1772758, Apr. 26, 2010, pp. 661-670.

Li, Jiacheng et al, "Time Interval Aware Self-Attention for Sequential Recommendation," https://doi.org/10.1145/3336191.3371786, Jan. 22, 2020, 9 pages.

Quadrana, Massimo et al, "Personalizing Session-based Recommendations with Hierarchical Recurrent Neural Networks," arXiv:1706.04148v5 [cs.LG] Aug. 23, 2017, 8 pages.

Marcus Auren et al., "Music Recommendations Based on Real-Time Data," May 2018, https://publications.lib.chalmers.se/records/fulltext/256144/256144.pdf, 56 pages.

\* cited by examiner

CONTEXTUAL BANDIT FOR MULTIPLE MACHINE LEARNING MODELS FOR CONTENT DELIVERY

BACKGROUND

Computer user interfaces (UIs) often present information that can vary dynamically. For example, web browsers serving pages, apps, and/or other software that facilitates network data transfer often receive variable data for display in their UIs. Specifically, these programs can present advertisements, offers, media, and/or other content items dynamically, so that when a user accesses the browser or app multiple times, they might see multiple different ads, offers, or media elements. Selections may appear random to the user, but in many cases, they are actually chosen deliberately. For example, selections may be curated, ranked, or otherwise specifically designated for display at set times or in set orders. In other cases, selections may be prioritized according to various algorithmic approaches. Many present state-of-the art systems recommend offers ranked based on a curated priority list, which does not consider user preference, behavior, or context. Attempts to design algorithms to provide personalized offers for each user are hampered by the number of options available when designing the algorithms, including types of algorithms, input values, output values, etc. Many of these choices are not straightforward and what may be suitable for one user may not be suitable for another user.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

A contextual bandit system employs a machine learning (ML) model, sometimes referred to herein as an oracle and an explore-exploit algorithm, to select a ML model from a plurality of available ML models, to determine personalized content recommendations for a user. The oracle, for example, uses contextual information specific for the user, such as user attributes and any other desired context information, such as day, time of day, location, etc., to select the ML model from a plurality of available ML models to determine the personalized content recommendation(s) to be presented to a user. The selected ML model generates the personalized content recommendation(s) to be presented to the user based on the same or different contextual information specific for the user as well as data related to the available content. The contextual bandit system includes the use of an explore-exploit algorithm as a trade-off between exploiting the ML model with highest estimated reward and exploring the use of other ML models to generate feedback to re-train the contextual bandit ML model to improve future selections of ML models by the oracle.

In one implementation, a computer-implemented method for delivery of content includes receiving user information for a request payload from an external device and receiving data describing a plurality of user interface (UI) elements configured to be presented in a UI of the external device. The method includes selecting a machine learning (ML) model from a plurality of ML models using a contextual bandit ML model that is trained based on the user information. The method also includes determining with a selected ML model based on the user information and the data describing the plurality of UI elements, at least one recommended UI element from the plurality of UI elements and providing the at least one recommended UI element for presentation in a UI of the external device. The method includes receiving event data indicating a user interaction with the at least one recommended UI element in the UI of the external device, and re-training the contextual bandit ML model based on the event data.

In one implementation, a system configured for delivery of content includes a user feature database; a user interface (UI) element database; and a processor in communication with the user feature database and the UI element database and configured to communicate with an external device through at least one network and configured to perform processing. The processor is configured to receive user information for a request payload from an external device and to receive data describing a plurality of user interface (UI) elements configured to be presented in a UI of the external device. The processor is further configured to select a machine learning (ML) model from a plurality of ML models using a contextual bandit ML model that is trained based on the user information. The processor is further configured to determine with a selected ML model based on the user information and the data describing the plurality of UI elements, at least one recommended UI element from the plurality of UI elements. The processor is further configured to provide the at least one recommended UI element for presentation in a UI of the external device. The processor further receives event data indicating a user interaction with the at least one recommended UI element in the UI of the external device, and re-trains the contextual bandit ML model based on the event data.

In one implementation, a system configured for delivery of content includes a featurization processor configured to receive user information for a request payload from an external device. The system further includes a contextual bandit processor configured to receive the user information from the featurization processor and to select a machine learning (ML) model from a plurality of ML models using a contextual bandit ML model that is trained based on the user information. The system further includes a recommendation processor configured to receive data describing a plurality of user interface (UI) elements configured to be presented in a UI of the external device and to determine with a selected ML model based on the user information and the data describing the plurality of UI elements, at least one recommended UI element from the plurality of UI elements and to provide the at least one recommended UI element for presentation in a UI of the external device. The system further includes an update processor configured to receive event data indicating a user interaction with the at least one recommended UI element in the UI of the external device, and to re-train the contextual bandit ML model based on the event data.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
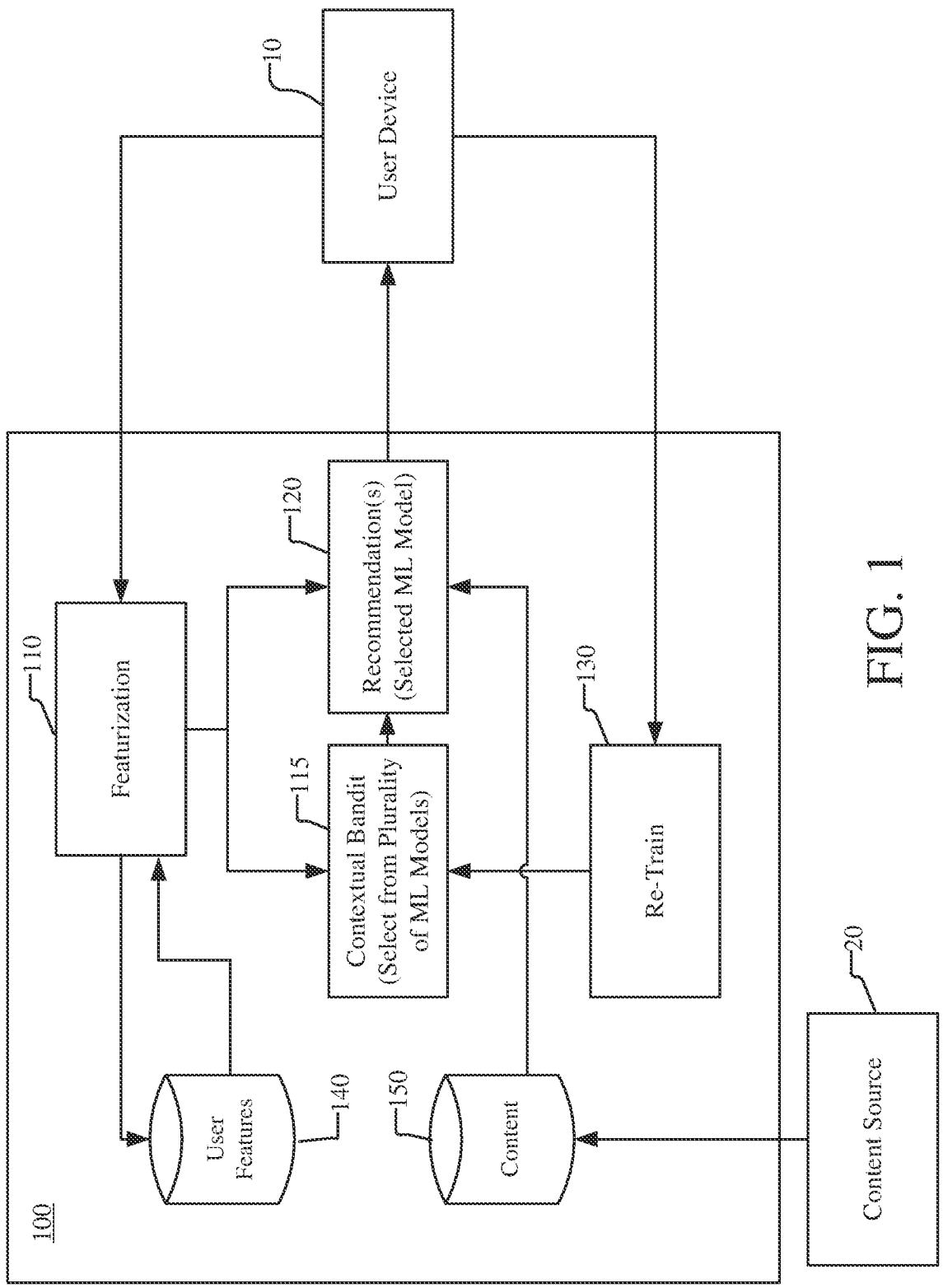
FIG. 1 shows an example machine learning content delivery system according to some implementations.

Specific implementations will now be described in detail with reference to the accompanying figures. Like elements in the various figures are denoted by like reference numerals for consistency. In the following detailed description, numerous specific details are set forth in order to provide a more thorough understanding of the present disclosure. However, it will be apparent to one of ordinary skill in the art that aspects of the disclosure may be practiced without these specific details. In other instances, well-known features have not been described in detail to avoid unnecessarily complicating the description.

User interfaces (UIs) may present content to users, e.g., in the form of a UI element, such as a window, page, dialog, pane, buttons, icons, etc. A user may respond to the content presented via the UI by interacting with the UI element, e.g., by clicking, tapping, holding a pointer over, or otherwise selecting a link or icon, lingering on a page, etc., or by ignoring the UI element. By way of specific examples, UI elements may be used to present content related to recommended offers, advertisements, information retrieval, media recommendations, etc. Specific examples described below may sometimes refer to UI elements that are related to offers, but it will be apparent that the systems and methods described herein is not limited to presentation of offers and that the UI elements may be used to present any desired content related to a specific user's interest.

One challenge encountered in the presentation of content to users is to provide content that is most relevant to a specific user and, thus, more likely to be consumed by the user. For example, in the context of financial offers, various products have different qualification requirements, whereas users have different financial backgrounds and proclivities for financial products. Accordingly, it may be desirable to personalize recommended offers for each user to increase the chance of acceptance of the offer. In another example in the context of advertisement, online systems may have many different ad configurations and placements within the UI, and it may be desirable to personalize such advertisements for each user to increase the chance of user consumption. Another challenge encountered is the shift of user preference over time. For example, content that may be currently relevant to a particular user may not be relevant over the long-term, e.g., due to changes in a user's situation (e.g., financial situation), goals, interests, and/or needs. By way of illustration, an article or video that may be of interest to a particular user on Monday morning may be different from the kinds of articles or videos that may be of interest to that user on Friday evening.

The selection of content to present to a user may be prioritized using algorithmic approaches to personalize the content for the users. An algorithm, such as a machine learning (ML) model, may be used to recommend personalized content for a user based on not only the content available, but on contextual information, such as the user's personal information as well as other contextual information, such as location, time of day, day of the week, the app being used by the user, etc. Different types of ML models may be used to generate content recommendations of content, such as models that use logistic regression, linear regression, non-linear regression, classification, etc. The same type of ML model may produce different content recommendations by altering various hyperparameters of the ML model, such as complexity of the model, number of nodes, leaves, depth, weights, biases, etc. Moreover, the same type of ML model may produce different content recommendations due to differences in the input information, e.g., user information, context information, etc.

There are several important choices to be made while building a ML model; some of these are simple modeling choices, for example, boosting vs random forest, whereas other choices are more complex and may be related to the selection of features or labels. Many such choices are not straightforward and require experimentation to identify an optimal option. Moreover, one ML model may provide recommendations that are suitable for one specific user, but not suitable for another user. Accordingly, it may be desirable to use multiple ML models for recommending content for users. A common solution for dealing with multiple competing models is to use an ensemble approach. However, the use of an ensemble approach ignores the fact that certain models may be better suited for a given user compared to other models and statistically better techniques are desired to achieve better results.

As discussed herein, a contextual bandit system is used to provide improved, automatic content presentation. Contextual bandits are conventionally used to directly select the recommended content, such as articles or financial offers, that is presented to the user. The downside of such an approach is that the contextual bandit methodology typically employs logistic or linear models that struggle or fail to capture the complex relationships that may be present between contextual information, the available content, and rewards. In contrast, as discussed herein, given a list of competing ML models, each of which can provide recommended content for a given user, a contextual bandit system is used to select the ML model that is used to determine the recommended content for the given user.

As discussed herein, the contextual bandit system employs an ML model, such as an optimal regressor or orchestrating model, which is sometimes referred to herein as an oracle, and an explore-exploit algorithm. The oracle receives input information, such as user information features and other desired context features and selects a ML model from a plurality of available ML models to determine the personalized content recommendation(s) to be presented to a user. The contextual bandit ML model may be trained, for example, based on user information, as well as contextual information relevant to a user any previously collected rewards and/or feedback from the user. The available ML models, for example, are supervised ML models that are trained to determine content recommendation(s) based on input features, such as user attributes related to the user's consumption of the content, e.g., the user's financial profile and spending behaviors, or the user's media or article interests, etc., and other context features such as geolocation, time of day and day of the week, the app used by the user, the available apps on the user device, etc., as well as data related to the available content for recommendation. The plurality of ML models may include an array of different type of ML models, including ML models based on neural networks or boosting, some of which may be linear while others may be highly non-linear, and/or models ML models of the same type, but that use different hyperparameters and/or that use different input features. The selected ML model may use the same or different input information to determine content recommendations as the contextual bandit ML model uses to select a ML model from the plurality of ML models. For example, the selected ML model may use the same or a different set of user information and/or context information as used by the contextual bandit ML model.

The oracle, for example, may use the input information to generate a reward estimate, e.g., score related to the probability of the content being relevant or expected revenue generated when the content is provided to the user, for each of the plurality of ML models. The estimated reward associated with each ML model, for example, may indicate the likelihood that ML model will produce recommended content that will be consumed by the user, i.e., the user will interact with in some manner, or an expected revenue resulting from the content being provided to the user. The contextual bandit system further includes an explore-exploit algorithm as a trade-off between exploiting the ML model with the greatest estimated reward or exploring the use of other ML models with a lower estimated reward, but that may provide higher future rewards. Additionally, exploring the use of ML models with lower estimated rewards may also enable the collection of feedback or rewards for content that may not have been recommended previously to the user. Feedback based on the user's interactions with the content recommendations is used to update, i.e., re-train, the contextual bandit ML model to improve future selections of ML models from the plurality of ML models so that recommended content for the user may be provided using the most appropriate ML model. Additionally, the individual ML models may be re-trained or new ML models may be trained based on the feedback to improve operation of the ML models. Thus, for example, exploring may be used to collect feedback-rewards for items that may not be available currently, so that when additional feedback is available, the contextual bandit ML model may be re-trained and individual ML models may be re-trained or developed based on the feedback-rewards.

The use of contextual bandit system to select the ML model that determines the recommended content for a user, as discussed herein circumvents the challenges faced by a conventional ML model and a conventional contextual bandit. By selecting a ML model from a plurality of ML models, complex and varied ML models may be available to optimize the determination of the recommended content. Moreover, the contextual bandit ML model that is used to select the ML model from the available ML models may be a relatively simple ML model, to reduce computer resources and computations. Consequently, the approach discussed herein may benefit from the availability of ML models that are able to capture complex relationships between features, content, and rewards, while using a relatively simple contextual bandit ML model to enable the determination of the most appropriate content for each customer.

FIG. 1 shows an example ML content delivery system 100 that may be used for providing recommended content to be presented to a user, according to some implementations. The ML content delivery system 100, for example, may provide content recommendations as one or more recommended user interface (UI) elements to be presented in the UI of an external device, such as user device 10. System 100 may include a variety of hardware, firmware, and/or software components that interact with one another and with user devices 10 and/or content sources 20. For example, system 100 includes featurization processor 110, oracle/ML processor 115, recommendation/ML processor 120, and update processor 130, each of which may be implemented by one or more computers (e.g., as described below with respect to FIG. 2). System 100 may also include non-transitory memory which may include one or more databases such as user features database 140 that may communicate with featurization processor 110 and content database 150 that may receive and store content from content sources 20.

As described in detail below, user device 10 in communication with system 100 (e.g., through the Internet or another network or networks) may request data from system 100. The request for data may include a request for recommended content, e.g., one or more UI elements, to be displayed in a UI of user device 10, as well as user identifier or user information and, optionally, additional context information. Featurization processor 110 may use the request payload from user device 10 to obtain user information, e.g., directly or from user feature database 140 based on a user identifier. The featurization processor 110 may produce one or more input feature vectors from the use information, as well as any additional context data, e.g., provided with the request for data. The user information, for example, may include user attributes related to the user's consumption of the content, e.g., the user's financial profile and spending behaviors, the user's media or article interests, etc., and other context features such as geolocation, time of day and day of the week, the app used by the user, the available apps on the user device, etc.

Using an input feature vector from featurization processor 110, contextual bandit ML processor 115 may select a ML model from a plurality of ML models to determine recommended content, e.g., at least one recommended UI element, to be presented to the user device 10 for presentation in the UI. The ML models in the plurality of ML models, by way of example, may be supervised ML models trained with labels as the content/offers. Each ML model in the plurality of ML models is a supervised ML model trained to determine content recommendation(s) based on an input feature vector produced by featurization processor 110. The plurality of ML models may include an array of different type of ML models, including ML models based on neural networks or boosting, some of which may be linear while others may be highly non-linear, and/or models ML models of the same type, but that use different hyperparameters and/or that use different input feature vectors. The input feature vectors used by the ML models in the plurality of ML models may include the same or different user information and context data as used in contextual bandit ML processor 115 and as used by other ML models in the plurality of ML models.

The recommendation/ML processor 120 uses the selected ML model and, e.g., an input feature vector from featurization processor 110, and available content from content database 150, to determine the recommended content, e.g., the at least one recommended UI element, and send the recommendation(s) for presentation in the UI of the user device 10. The content database 150, for example, may contain content features. For example, if the content is news articles, each article can have features such as the type of article (e.g., sports, financial, human interest, etc.), number of words, etc. The recommended content, by way of example, may include a recommended offer, link to another app or page, media content, information, etc. or any other desired UI element to be provided for presentation on the user device 10.

User device 10 may report user interactions with the recommended content to update processor 130 and/or update processor 130 can detect such interactions from network traffic data. Update processor 130 can update the contextual bandit ML processor 115 based on the interactions. In some implementations, update processor 130 may additionally update one or more models used in the recommendation/ML processor 120. FIGS. 3-8 illustrate the functioning of system 100 in detail.

User device 10, content source 20, system 100, and individual elements of system 100 (featurization processor 110, contextual bandit ML processor 115, recommendation/ML processor 120, update processor 130, user feature database 140, and content database 150) are each depicted as single blocks for ease of illustration, but those of ordinary skill in the art will appreciate that these may be embodied in different forms for different implementations. For example, system 100 may be provided by a single device or plural devices, and/or any or all of its components may be distributed across multiple devices. In another example, while featurization processor 110, contextual bandit ML processor 115, recommendation/ML processor 120, update processor 130, user feature database 140, and content database 150 are depicted separately, any combination of these elements may be part of a combined hardware, firmware, and/or software element. Moreover, while one user device 10 and one content source 20 are shown, in practice, there may be multiple user devices 10, multiple content sources 20, or both.

Figure 2:
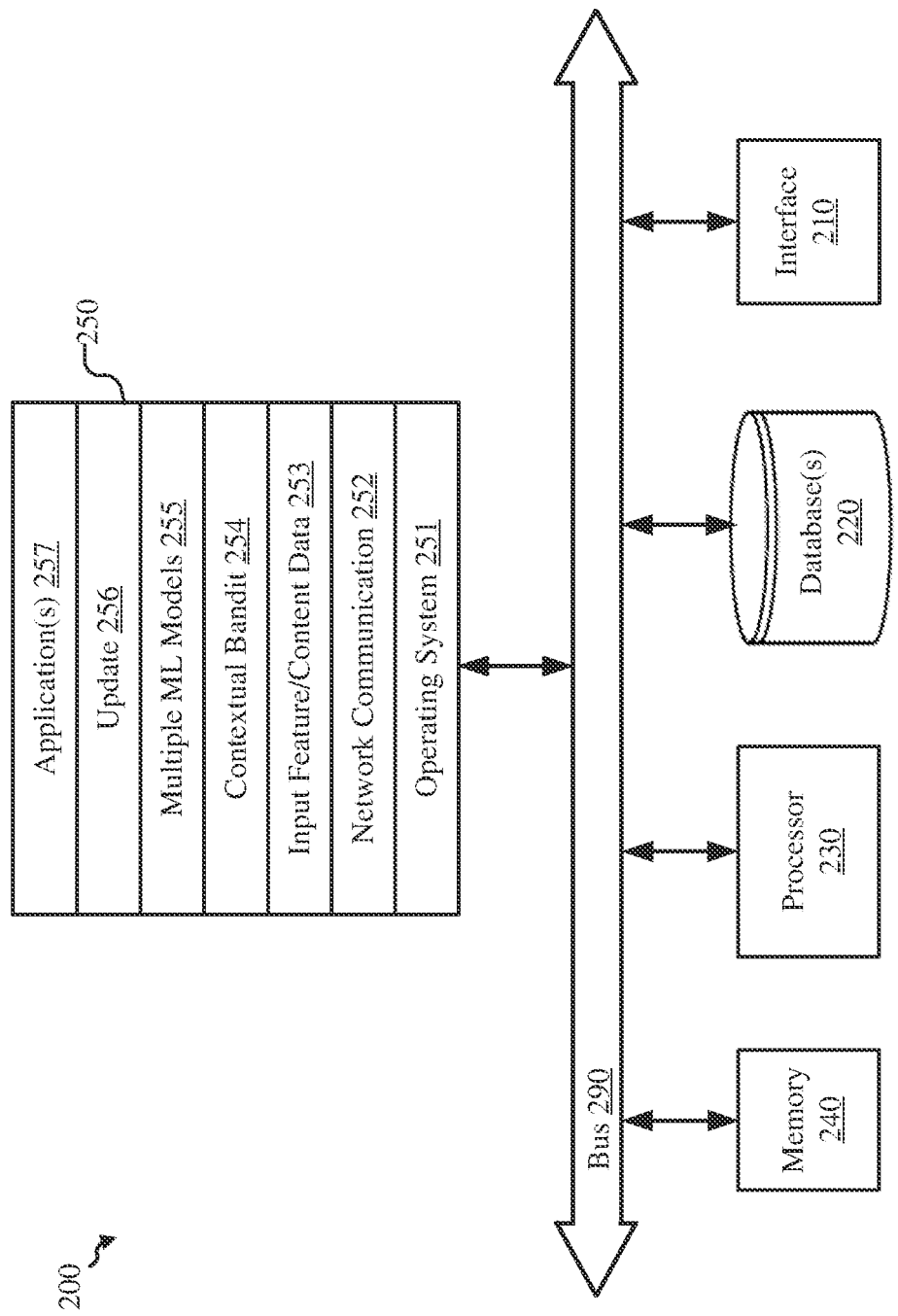
FIG. 2 shows a computer system that may be used for content delivery according to some implementations.

FIG. 2 shows an example computer system 200 that may be used for providing recommended content, e.g., at least one recommended UI element, for presentation in the UI of an external device, according to some implementations. Computer system 200 may implement system 100, shown in FIG. 1, or any portion(s) thereof, or multiple computer system 200 may implement system 100. Computer system 200 may be implemented on any electronic device that runs software applications derived from compiled instructions, including without limitation personal computers, servers, smart phones, media players, electronic tablets, game consoles, email devices, etc. The computer system 200 includes at least one interface 210, at least one database 220, at least one processor 230, memory 240, and computer-readable medium 250. In some implementations, the various components of the computer system 200 may be interconnected by at least one data bus 290, which may be any known internal or external bus technology, including but not limited to ISA (Industry Standard Architecture), EISA (Extended Industry Standard Architecture), PCI (Peripheral Component Interconnect), PCI Express, NuBus, USB (Universal Serial Bus), Serial ATA (Serial Advanced Technology Attachment), or FireWire. In other implementations, the various components of the computer system 200 may be interconnected using other suitable signal routing resources, for example, the components may be distributed among multiple physical locations and coupled by a network connection.

The interface 210 may be one or more network interfaces through which information may be received from external devices and information may be transmitted to external devices. For example, the interface 210 may be used to receive user information for a request payload from external devices, such as user device 10 shown in FIG. 1, and to provide to the external devices, e.g., the user device 10 or an intermediate device, recommended content, e.g., at least one recommended UI element, for presentation in the UI of the user devices. The interface 210 may be further used to communicate with external sources of content, such as content source 20 shown in FIG. 1. An example interface may include a wired interface or wireless interface to the internet or other means to communicably couple with other devices. For example, the interface 210 may include an interface with an ethernet cable or a wireless interface to a modem, which is used to communicate with an internet service provider (ISP) directing traffic to and from other devices (such as a user's local computer system and computer systems or servers for accessing the publicly available inventories). In some implementations, the interface 210 may further include a display, an input device, such as a mouse and keyboard, or other suitable input or output elements that allow interfacing with administrators.

The database 220 may store data obtained by the interface 210 and as determined by the processor 230, as discussed herein. For example, the database 220 may include the user features database 140 and/or the content database 150 shown in FIG. 1.

The processor 230 may use any known processor technology, including but not limited to graphics processors and multi-core processors. The processor 230 may be capable of executing scripts or instructions of one or more software programs stored in computer system 200 (such as within the memory 240 and/or computer-readable medium 250). For example, the processor 230 may be capable of executing one or more applications of the various instructions stored in computer-readable medium 250, as discussed herein. The processor 230 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processor 230 may include a combination of computing devices (such as a combination of a DSP and a microprocessor, a plurality of microprocessors, one or more microprocessors in conjunction with a DSP core, or any other such configuration).

The memory 240 may be any memory (such as RAM, flash, etc.) that temporarily or permanently stores data, such as any number of software programs, executable instructions, machine code, algorithms, and the like that can be executed by the processor 230 to perform one or more corresponding operations or functions. In some implementations, the memory 240 may be connected directly to or integrated with the processor 230, e.g., as a processing in memory (PIM) chip.

Computer-readable medium 250 may be any medium that participates in providing instructions to the processor 230, directly or via memory 240, for execution, including without limitation, non-volatile storage media (e.g., optical disks, magnetic disks, flash drives, etc.), or volatile media (e.g., SDRAM, ROM, etc.). In some implementations, hardwired circuitry may be used in place of, or in combination with, software instructions to implement aspects of the disclosure. As such, implementations of the subject matter disclosed herein are not limited to any specific combination of hardware circuitry and/or software.

Computer-readable medium 250 may include various instructions, such as instructions for implementing an operating system 251 (e.g., Mac OS®, Windows®, Linux, etc.). The operating system may be multi-user, multiprocessing, multitasking, multithreading, real-time, and the like. The operating system may perform basic tasks, including but not limited to recognizing input from input devices in the interface 210, sending output to display devices in the interface 210, keeping track of files and directories on computer-readable medium 250, controlling peripheral devices (e.g., disk drives, printers, etc.) which can be controlled directly or through an I/O controller, and managing traffic on bus 290. Network communications instructions 252 may establish and maintain network connections via the interface 210 (e.g., software for implementing communication protocols, such as TCP/IP, HTTP, Ethernet, telephony, etc.).

Input feature/content data instructions 253 may include the user feature and/or content lookup tables and/or the instructions that enable computer system 200 to perform data lookup from database(s) 220, e.g., operating as user feature database 140 and/or content database 150 shown in FIG. 1, and/or vector formation functions, e.g., performing featurization processor 110 shown in FIG. 1, as described herein. Contextual bandit instructions 254 may enable computer system 200, e.g., to perform contextual bandit ML processor 115 shown in FIG. 1, to select a ML model from a plurality of ML models to determine the recommended content to be presented to the user device for presentation in the UI and/or to perform ML functions (e.g., training and re-training of the contextual bandit ML model), as discussed herein. Multiple ML models instructions 255 may enable computer system 200, e.g., to perform recommendation/ML processor 120 shown in FIG. 1, to determine and provide the recommended content to be presented to the user device for presentation in the UI, as discussed herein. Update instructions 256 may enable computer system 200, e.g., to perform update processor 130 shown in FIG. 1, to update (i.e., re-train) the contextual bandit ML model, and in some implementations to additionally update (i.e., re-train) one or more supervised ML models, based on the interactions of a user with the recommended content, e.g., at least one UI element, presented in the UI of the user device. Application(s) instructions 257 may be an application that uses or implements the processes described herein and/or other processes. In some implementations, one or more of the various processes may also be implemented in operating system 251.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. A computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship with each other.

One or more features or steps described herein may be implemented using an Application Programming Interface (API) and/or Software Development Kit (SDK), in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

Figure 3:
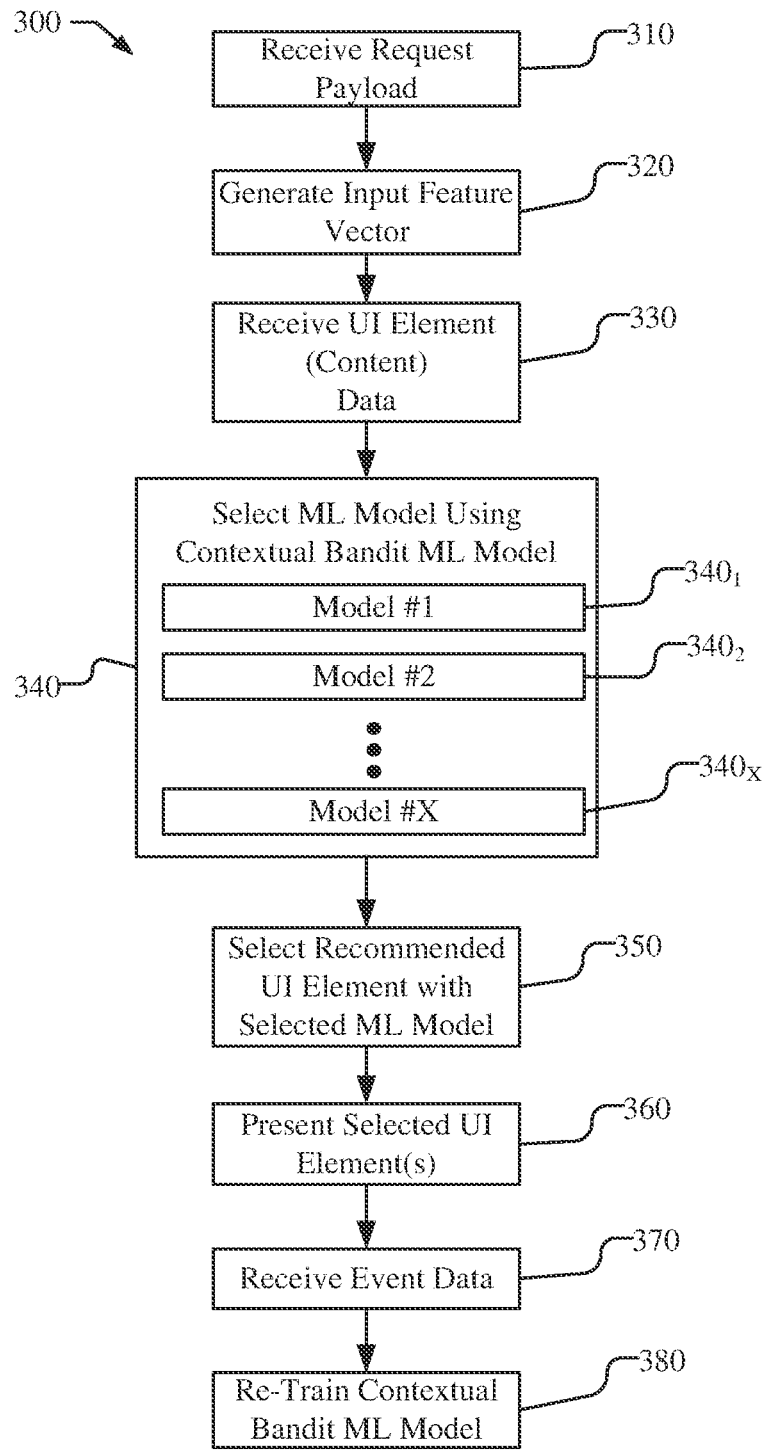
FIG. 3 shows an example content delivery process according to some implementations.

FIG. 3 shows an example content delivery process 300 according to some implementations. ML content delivery system 100 shown in FIG. 1 and/or computer system 200 shown in FIG. 2 may perform process 300 to deliver recommended content, e.g., at least one UI element, such as offers, links, media content, information, etc., to user device 10 and to process the user's interaction with the recommended content. For example, the contextual bandit/ML processor 115 shown in FIG. 1 may select a ML model from a plurality of ML models and may train itself based on how the user of user device 10 interacts with the recommended content, as described in detail below.

At 310, system 100 may receive a request payload from an external device (e.g., user device 10). The request payload can include a user identifier or user information. For example, the user of user device 10 may log in to the device, an app on the device, a website, etc., with an identifier. The identifier is sent from user device 10 to system 100 as the request payload or as a part of the request payload. For example, the request payload may be an explicit request for recommended content (e.g., a UI element) to be displayed in the UI of user device 10, or it may be a more general payload (e.g., a login from user device 10 to system 100 or a service provided by system 100).

In some implementations, the request payload may include additional context data. For example, the request payload may include not only the user identifier or user information, but may also include context features such as a time stamp, a user device 10 location, apps running on user device 10, an app used to send the request payload, etc.

At 320, system 100 may generate at least one input feature vector from contextual information, such as user information, which may be obtained from the user identifier, and any additional context data. For example, as described in detail with respect to FIG. 4 below, system 100 may perform a fast lookup in user feature database 140 using the user identifier. User feature database 140 may include features of the user that are associated with the user identifier in the data structure. System 100 may assemble the features returned in the lookup into a vector of length N, where N is the number of features returned.

In some implementations, generating the at least one input feature vector may further include adding the context data to the data extracted from a database. For example, an input feature vector may include the features from user feature database 140 plus features indicated in the context data (e.g., defined user features plus context user features of time, location, apps, etc.), giving a vector of length M=(N+C), where C is the number of features indicated in the context data.

In some implementations, a plurality of input feature vectors may be generated using different sets of user information and context data. For example, the contextual bandit ML model may use different user information or context data as input features than is used by one or more of the ML models in the plurality of ML models. For example, the contextual bandit ML model may use all available user information and context data, while one or more of the available ML models may use only a subset of the available user information and context data. In some implementations, a first input feature vector may be generated at 320 for the contextual bandit ML model based on a first set of user information and/or context data, and a second input feature vector may be generated for a selected ML model, after selection of the ML model at 340, discussed below, based on a second (different) set of user information and/or context data. In some implementations, each input feature vector may be generated at 320 for the contextual bandit ML model and each of the available ML models before selection of the ML model at 340, discussed below. In some implementations, a number of the ML models in the plurality of ML models may use different sets of user information and/or context data as input feature vectors. Accordingly, in an implementation in which all input feature vectors are generated at 320 before selection of the ML model at 340, discussed below, separate input feature vectors may be generated for each available ML models and the contextual bandit ML model.

At 330, system 100 may receive data describing a plurality of UI elements (content) configured to be presented in a UI of the external device (e.g., user device 10). In some implementations, system 100 may receive elements directly from one or more content sources 20 and/or may have them available in local memory (e.g., when the number of available elements is small, this may be efficient). In other implementations, system 100 may perform a fast lookup in content database 150 similar to that performed in user feature database 140 above, as described in detail with respect to FIG. 5.

At 340, system 100 may select a ML model from a plurality of ML models using a trained contextual bandit ML model. The contextual bandit ML model may be trained, for example, based on user information, such as user identifiers, and may be further trained based on contextual information relevant to a user, such as location, time of day, day of the week, the app being used by the user, etc. The contextual bandit ML model may additionally be trained based on any previously collected rewards and/or feedback from the user. The plurality of ML models may include X models, illustrated as model #1 $340_1$, model #2 $340_2$ ... model #N $340_X$. Each ML model in the plurality of ML models may be a supervised ML model trained to determine content recommendation(s) based on the same or different input feature vectors. The ML models may be logistic, linear, or nonlinear models, and may be based on a neural network, boosting, etc. The ML models in the plurality of ML models may include different types of ML models, the same types that use different hyperparameters, such as complexity of the model, number of nodes, leaves, depth, weights, biases, etc., and/or that use different input feature vectors. The contextual bandit ML model used at 340, for example, may use an oracle, e.g., an optimal regressor or orchestrating model, and an explore-exploit algorithm to select a ML model from the plurality of ML models based on the input feature vector. Selection of a ML model by the contextual bandit ML model is described in detail below with respect to FIG. 6.

At 350, system 100 determines at least one recommended UI element using the selected ML model. For example, if at 340 the contextual bandit ML model selected ML model $340_2$, then ML model $340_2$ will be used to determine at least one recommended UI element based on an input feature vector, e.g., from 320, and the data describing the plurality of UI elements, e.g., from 330. The remaining, un-selected, ML models, e.g., ML model $340_1$, ML model $340_3$, and ML model $340_4$ in the present example, need not determine a recommendation, which is computationally more efficient for the system 100. The determination of the at least one recommended UI element may be performed by the selected ML model at 350 using the same or different input feature vector as used by the contextual bandit ML model at 340. As discussed above at 320, the input feature vector for the selected ML model may be generated after selection at 340, or all input feature vectors for the plurality of ML models may be generated before selection at 340, and the input feature vector associated with the selected ML model is retained and used at 350. Similarly, the system 100 may receive the data describing the plurality of UI elements at 330 after selection of the ML model at 340, or the system 100 may receive the data describing the plurality of UI elements at 330 before the system 100 selects the ML model at 340 and the data describing the plurality of UE elements is retained and used at 350. As an alternative, in some implementations, each of the plurality of ML models may separately generate respective sets of at least one recommended UI element before selection of the ML model, e.g., 350 may be performed before 340, and only the set of at least one recommended UI element produced by the ML model selected at 340 is retained and used, but this may be less computationally efficient. Determination of at least one recommended UI element by a selected ML model is described in detail below with respect to FIG. 7.

At 360, system 100 may cause the at least one recommended UI element to be presented in the UI of the external device (e.g., user device 10). For example, system 100 may send the recommended UI element(s) to user device 10, may send data indicating where user device 10 can retrieve the recommended UI element(s) (e.g., an external network host) to user device 10, may send a command to user device 10 to display the recommended UI element(s) which it already has locally, etc. In any case, user device 10 may display the recommended UI element(s) in its UI in response.

At 370, system 100 may receive event data indicating a user interaction with the at least one recommended UI element in the UI of the external device (e.g., user device 10). For example, this may be "reward" data, where a user interaction (e.g., a click) with the UI element gets a reward (e.g., value=1) and a failure of the user to interact (e.g., the user ignores the element) does not get a reward (e.g., value=0). Such rewards can be identified from click records and/or from event logs, where event logs include entries such as "impression" for presentation of a UI element, "click" for a click, "dwell time" for time that the UI element is displayed (e.g., time during which it is not scrolled past, indicating it is potentially being read), etc. As such, the event data from the user interaction may indicate whether the at least one recommended UI element was correctly predicted by the selected ML model.

In some implementations, user device 10 may directly report when a user interaction takes place. However, some implementations may use batch updating to avoid excessive transmission over the network and to avoid false negatives. For example, given a large enough set of user devices 10 interacting with system 100, ad hoc reporting of user interactions may be bandwidth intensive. Also, a user may not necessarily interact with a UI element as soon as it is presented, but instead may be busy with another task and may click on the UI element later, such that it would be a false negative to report a value=0 too quickly. As such, these implementations do not send event data to system 100 right away. Instead, the data may be cached or collected in some bulk manner (e.g., as clickstream data over a given period of time), with a batch update to system 100 occasionally or periodically (e.g., every 24 hours or some other interval).

At 380, system 100 may re-train the contextual bandit ML model using the event data, which may be compiled over time. As described below in detail with respect to FIG. 8, event data indicating rewards or feedback for user interactions may be used to train the contextual bandit ML model, so the contextual bandit ML model may update its predictions based on which users clicked on which UI elements. As such, when process 300 is performed in the future, the selection of a ML model from a plurality of ML models at 340 may be more accurate so that the ML model selected is more likely to produce recommended content that is more relevant to the user's interests. This is not only useful to the user, but also is more efficient, as it allows appropriate data to be selected and sent to user device 10 more promptly than with a less effective content method or with a random selection, for example.

Figure 4:
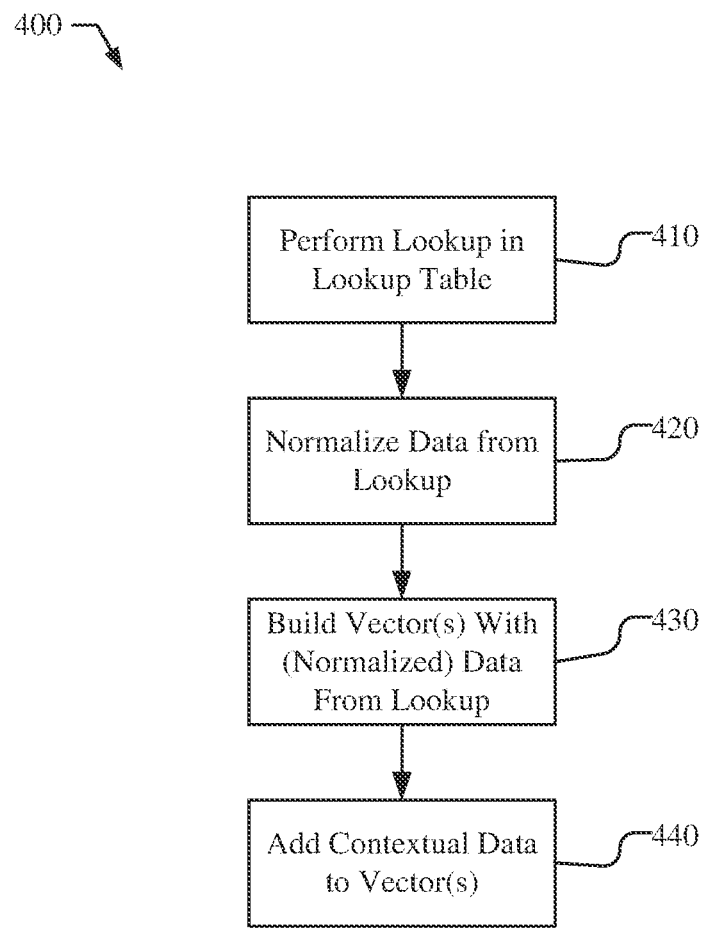
FIG. 4 shows an example input feature vector generation process according to some implementations.

FIG. 4 shows an example input feature vector generation process 400 according to some implementations. The input feature vector generation process 400 may be performed at 320 discussed in reference FIG. 3. As noted at 320 above, system 100 may generate an input feature vector for selecting a ML model from a plurality of ML models by a contextual bandit ML model at 340. The same input feature vector may be used by the selected ML model at 350 or system 100 may generate one or more different input feature vectors, based on a different set of user features, for determining at least one recommended UI element with the selected ML model at 350.

At 410, system 100 may perform a lookup in a lookup table of user feature database 140, e.g., based on user information, such as user identifier, received in the request payload at 310. For example, some implementations may be provisioned by building a user feature lookup table in order to conserve memory. Such a table may be built using SQLite and/or other database management systems. In this way, system 100 may be able to fast retrieve an input feature vector by looking up the identifier from the request payload (e.g., user identifier). Since the lookup table is a database on disk, which has zero memory consumption, system 100 may spin up parallel threads and enable massive parallel computing to perform the lookup. For example, in a table where each user (of approximately 11 million total users) has 250 different features, 60 parallel threads may return results in well below 100 milliseconds, making a user feature lookup in response to a request payload feasible in terms of computational efficiency and response time, yielding a technical and functional improvement over other lookup techniques.

[1] At 420, in some implementations, system 100 may normalize the data returned by the lookup at 410. In such implementations, separate respective user feature data entries may have different value scales and/or ranges, so to avoid weighting entries unevenly, the data may be normalized. For example, it will be apparent that features such as household size, age, credit score, and mortgages total balance, to name a few, will have very different value ranges and scales. System 100 may apply a normalization technique or algorithm to the data to adjust for the different value ranges and scales, for example feature scaling by subtracting the mean and dividing by the standard deviation.

At 430, system 100 may build one or more input feature vectors with the data returned by the lookup at 410 or, if normalized, the normalized data generated at 420. For each input feature vector, system 100 may assemble the features into a vector of length N, where N is the number of features returned and/or normalized.

At 440, system 100 may add context data to one or more input feature vector. As described above, the request payload may include additional context data in some implementations. Context data that may be added to the user feature vector may include, for example, one or more of time of day, day of week, device type, location, apps running on the user device, the app used to send the request payload, etc. System 100 may optionally normalize the context data in the same manner as the returned data. In cases where context data is available, the resulting vector(s) may include the features from user feature database 140 (as normalized, if applicable) plus the features indicated in the context data (as normalized, if applicable), so that for each input feature vector, the system 100 may assemble the features into a vector of length M=(N+C), where C is the number of features indicated in the context data.

In some implementations, a plurality of input feature vectors may be generated using different sets of user information and/or context data. For example, a first input feature vector may be generated for the contextual bandit ML model based on a first set of user information and/or context data and a second input feature vector may be generated for a selected ML model based on a second (different) set of user information and/or context data. In some implementations, the second input feature vector for the selected ML model may be generated after selection of the selected ML model by the contextual bandit ML model. In some implementations, all input feature vectors are generated prior to selection of the selected ML model. For example, in implementations in which all input feature vectors are generated before selection of the ML model, separate input feature vectors may be generated for the contextual bandit ML model and for each available ML models that uses a different input feature vector.

Figure 5:
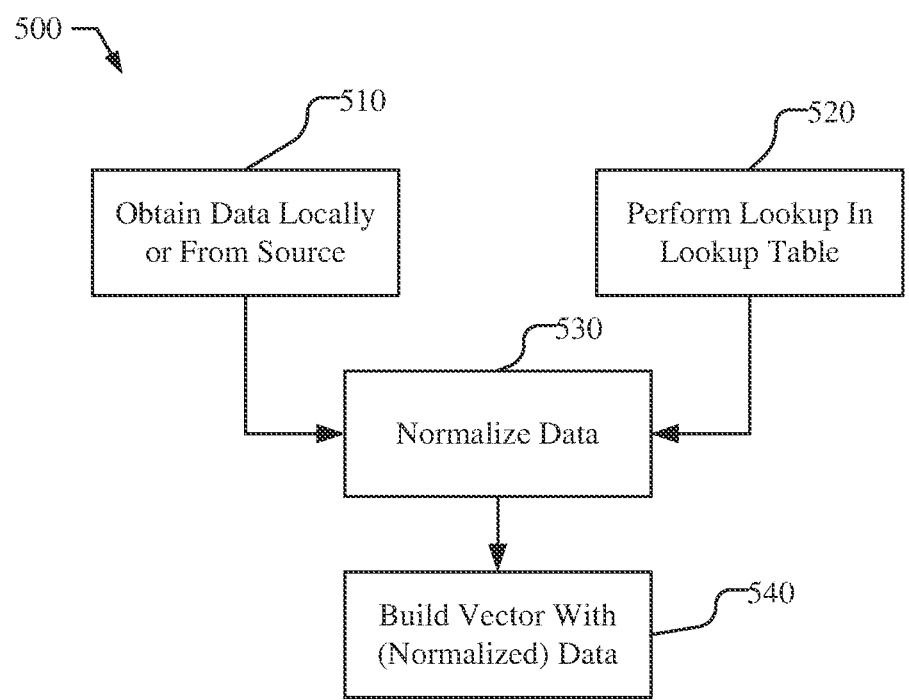
FIG. 5 shows an example content data generation process according to some implementations.

FIG. 5 shows an example content data generation process 500 according to some implementations. As with the user and context features, system 100 may generate content feature vectors for use in selecting a ML model from a plurality of ML models by the contextual bandit ML model, and in some implementations for determining content recommendations, e.g., at least one UI element, by the selected ML model. The content features, for example, may be information relevant to the content, such the type, subject matter, length, etc. In the examples of FIG. 5, the content feature vectors are UI element vectors for UI elements available to be presented in the UI, but it will be understood that other content vectors may be generated in the same fashion in other implementations.

At 510 and/or 520, system 100 may obtain content (UI element) data. Content data can be obtained for multiple contents (e.g., 10 UI elements) so that the content can be ranked and provided by the content process as described below. For example, at 510, system 100 may receive a list of elements (e.g., a list of element IDs) from which to choose from an external source. In some implementations, this may be part of the request payload received at 310. In other implementations, this may be obtained from another source (e.g., content sources 20 or some business logic configured to select element IDs based on rules, ML, or even randomly).

The complete set of possible content may be available from one or more content sources 20 and/or may be available in local memory (e.g., when the number of available elements is small, this may be efficient). In some implementations, the complete set of possible content may be in content database 150, and at 520, system 100 may perform a fast lookup in content database 150 similar to that performed in user feature database 140 above. For example, some implementations may be provisioned by building a content feature lookup table in order to conserve memory. Such a table could be built using SQLite and/or other database management systems. In this way, system 100 may be able to fast retrieve content feature vectors by looking up content identifiers. Since the lookup table is a database on disk, which has zero memory consumption, system 100 may spin up parallel threads and enable massive parallel computing to perform the lookup.

At 530, in some implementations, system 100 may normalize the data obtained at 510 and/or 520. In such implementations, separate respective content feature data entries can have different value scales and/or ranges, so to avoid weighting entries unevenly, the data can be normalized. System 100 can apply a normalization technique or algorithm to the data to adjust for this, for example feature scaling by subtracting the mean and dividing by the standard deviation.

At 540, system 100 may build a content feature vector for the data returned by the obtained at 510 and/or 520 or, if normalized, the normalized data generated at 530. System 100 may assemble the features into a vector of length L, where L is the number of features returned and/or normalized.

Figure 6:
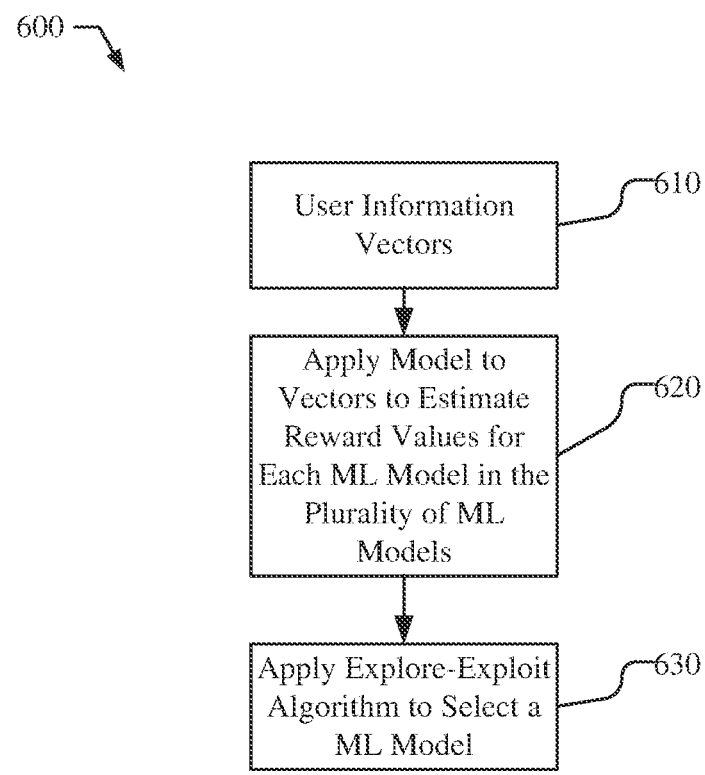
FIG. 6 shows an example contextual bandit process according to some implementations.

FIG. 6 shows an example contextual bandit process 600 according to some implementations. The contextual bandit process 600 may be implemented by a contextual bandit ML model, e.g., performed at 340 discussed in reference to FIG. 3. System 100 may use the contextual bandit process 600 that is trained to select at least one of the plurality of ML models to determine the content recommendations that are personalized based on user information. The contextual bandit ML model may be trained, for example, based on user information, such as user identifiers, and may be further trained based on contextual information relevant to a user, such as location, time of day, day of the week, the app being used by the user, the available apps on the user device, etc. The contextual bandit ML model may additionally be trained based on any previously collected rewards and/or feedback from the user. As discussed above, each ML model in the plurality of ML models may be a supervised ML model trained to determine content recommendation(s) based on the same or different input feature vectors. The ML models in the plurality of ML models may be logistic, linear, or non-linear models, and may be based on a neural network, boosting, etc. The ML models in the plurality of ML models may include different types of ML models, the same types that use different hyperparameters, such as complexity of the model, number of nodes, leaves, depth, weights, biases, etc., and/or that use different input feature vectors. The selection of a ML model from a plurality of ML models performed in contextual bandit process 600 may use a contextual bandit ML model that takes an input data vector (which may include user information features and context features) as input and applies a contextual bandit approach of exploitation and exploration.

At 610, system 100 obtains user information, such as input feature vector, from 320 shown in FIG. 3.

At 620, system 100 may apply an oracle, e.g., a regressor or orchestrating ML model, to the vector from 610 to estimate a current reward value associated with of each of the ML models from the plurality of ML models. System 100, for example, may apply a trained oracle model, e.g., a logistic regression or linear regression model, and regress the vector from 610 for each of the plurality of ML models on a continuous value to obtain an estimate of the reward associated with ML model based on the contextual information. The reward estimate for each ML model, for example, may correspond to the state of the environment resulting from providing the content to the user, and for example may be represented as a score based on user action (e.g., 1=click on content, 0=no click on content), the probability of the content being relevant or consumed by the user, the expected revenue generated when the content is provided to the user (e.g., dollar amount), time spent by the user interacting with the recommended content, etc. A higher reward estimate indicates a higher likelihood of user interaction as determined based on the content of the vector and the oracle model. In logistic regression, for example, the outputs of the model may include estimates of click propensity in the range [0,1]. In linear regression, outputs can still be generally in this range but not bounded by 0 and 1. In some implementations, different algorithms may be used (e.g., classification rather than regression, etc.).

The contextual bandit ML model additionally uses an explore-exploit algorithm, which trades-off between exploiting the most promising ML model by selecting the ML model associated with the highest reward estimate and exploring other ML models that could provide higher future rewards. For example, the contextual bandit ML model may exploit the highest reward estimate by selecting the ML model with the greatest estimated reward, as that ML model that will presumably produce recommended content with which the user will most likely interact. The contextual bandit ML model may alternatively explore other ML models, by selecting a ML model that does not have the greatest estimated reward in order to discover additional information about rewards associated with content recommended by the ML model, which may be used to further train the contextual bandit ML model, as explained in detail below with respect to FIG. 8.

At 630, system 100 may apply an explore-exploit algorithm to the reward estimates from 620. Various explore-exploit algorithms exist and may be used by system 100, such as a softmax algorithm or an epsilon-greedy algorithm. For example, in one implementation, system 100 may employ a softmax algorithm to select a ML model stochastically. This means the more confident the reward model is on a candidate ML model, the higher the probability that this ML model will be selected. The output of the softmax algorithm may be a probability distribution of all the ML models in the plurality of ML models, with a sum of all probabilities being equal to 1. For example, the following formula may be used, where i indicates a ML model (or ID), $z_i$ indicates the estimated reward for the $i^{th}$ model, and K is the total number of ML models and $\beta$ is a hyperparameter:

$$\sigma(z)_i = \frac{e^{\beta z_i}}{\sum_{j=1}^{K} e^{\beta z_j}} \text{ or } \sigma(z)_i = \frac{e^{-\beta z_i}}{\sum_{j=1}^{K} e^{-\beta z_j}} \text{ for } i = 1, \ldots, K.$$

In another example, system 100 may employ an epsilon-greedy algorithm in order to maintain a certain degree of pure exploration and ensure full probability support of available actions. For example, an epsilon-greedy algorithm applied to a ML model probability vector [0.8, 0.2] (two ML models: a and b) may work as follows: with probability epsilon, pick a ML model randomly, hence each ML model has 50% of chance being selected; with probability 1-epsilon, pick a ML model following the ML model probability vector (i.e., 80% of chance selecting ML model a, and 20% of chance selecting ML model b), or pick the ML model with the highest probability value (i.e., selecting ML model a with a ML model probability vector of 0.8 in the present example).

After applying the explore-exploit algorithm, system 100 may have translated the reward estimate into a probability distribution where the total probabilities of all of the ML model options add up to 1 and selected an ML model according to the explore-exploit algorithm outcome as discussed above.

Figure 7:
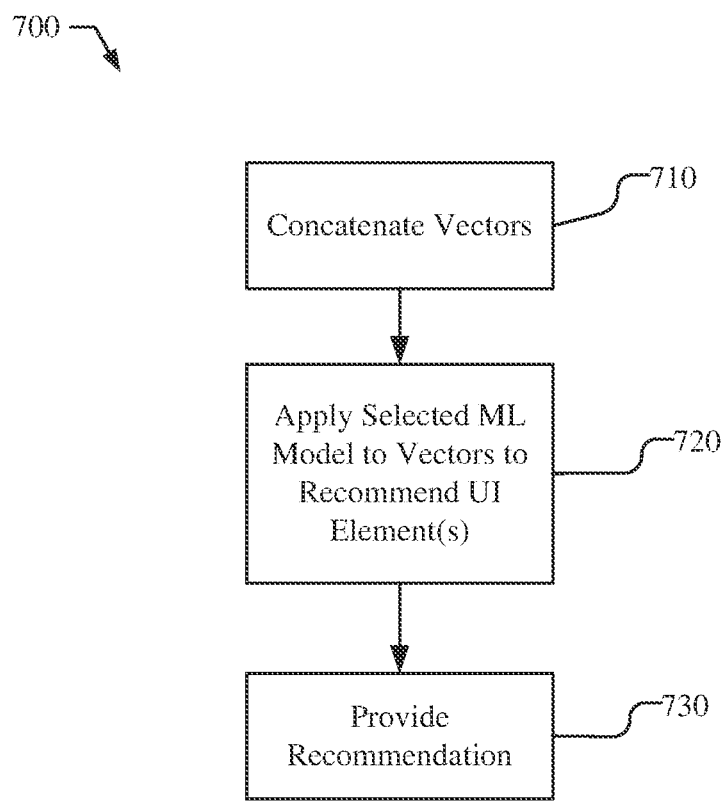
FIG. 7 shows an example recommendation process according to some implementations.

FIG. 7 shows an example recommendation process 700 according to some implementations. The recommendation process 700 may be performed at 350 discussed in reference to FIG. 3. System 100 generates recommended content including at least one recommended UI element using the selected ML model that is selected at 340 in FIG. 3, e.g., using the contextual bandit process 600 discussed in FIG. 6. It should be understood that if desired, each of the plurality of ML models may separately determine recommended content, e.g., before selection of the ML model by the contextual bandit ML model in the contextual bandit process 600, and only the recommended content determined by the selected ML model is retained, which would require additional processing resources.

At 710, system 100 may concatenate vectors that include user information, e.g., from 320 shown in FIG. 3, and data describing the plurality of UI elements, e.g., from 330 shown in FIG. 3. For example, system 100 may concatenate the input feature vector, which may include user information features and any desired context features with the content feature vector describing the plurality of UI elements. The input feature vector, for example, may be the same or a different feature vector that is used by the contextual bandit ML model in 340 shown in FIG. 3 or in contextual bandit process 600 shown in FIG. 6. The concatenation of the input feature vector and the content feature vector serves as input into the selected ML model.

At 720, system 100 may apply the selected ML model to the vector from 710. The selected ML model is a supervised ML model trained to determine recommended content, e.g., at least one recommended UI element, based on the user information and any desired context information, and data related to the available content. The selected ML model, for example, may be trained to recommend a single UI element, or to recommend a plurality of UI elements, e.g., in ranked order. For example, system 100 may apply the selected ML model, which may be, e.g., a logistic regression, linear regression, non-linear regression model, classification, etc., and regress vectors from 710 on a continuous value to obtain an estimate of the reward associated with each UI element or a probability score indicating the probability that the user would click on or otherwise interact in the UI. A higher reward estimate indicates a higher likelihood of user interaction as determined based on the content of the vector and the selected ML model. In logistic regression, the outputs of the model can include estimates of click propensity in the range [0,1]. In linear regression, outputs can still be generally in this range but not bounded by 0 and 1. In nonlinear regression, outputs are determined in a nonlinear fashion and may be generally in this range but not bounded by 0 and 1. In some implementations, different algorithms may be used (e.g., classification rather than regression, etc.).

At 730, system 100 may provide the recommended content, e.g., at least one recommended UI element. System 100, for example, may provide the recommended content by sampling from the reward estimates to choose the action to recommend (i.e., the one or more UI elements to present). For example, a predetermined number of UI elements may be provided in ranked order. In another example, UI elements having a reward estimate greater than a predetermined threshold may be provided in ranked order. The recommended content may be provided for presentation in the UI of the external device (e.g., user device 10), e.g., as discussed at 360 of FIG. 3.

Figure 8:
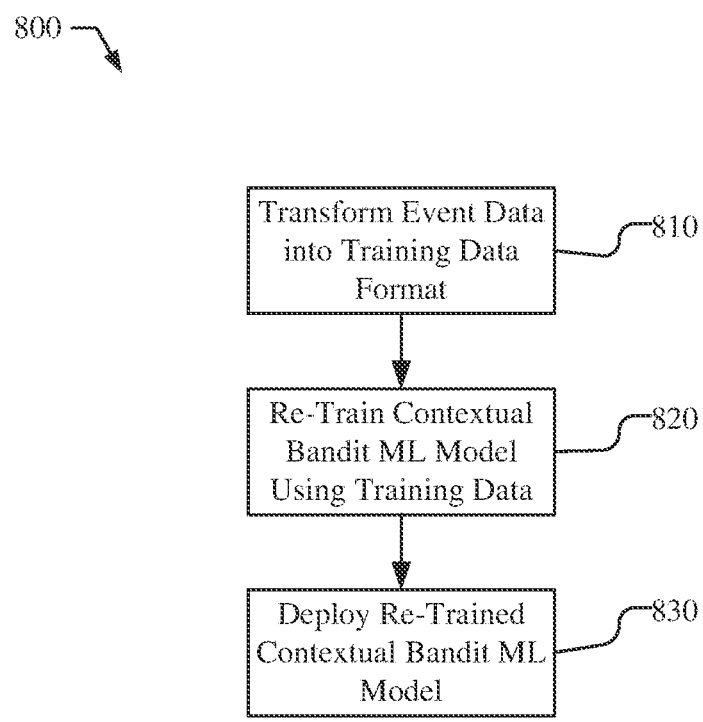
FIG. 8 shows an example training process according to some implementations.

FIG. 8 shows an example training process 800 according to some implementations. The training process 800 may be performed at 380 discussed in reference to FIG. 3. Event data received at 370 in process 300 may be used to re-train the contextual bandit ML model, so the contextual bandit ML model can update its predictions for selecting a ML model from the plurality of ML models based on which users clicked on (or otherwise interacted with) UI elements determined by which ML models. As such, when process 300 is performed in the future, the selection of the ML model by the contextual bandit ML model may result in a selected ML model that produces recommended content that may be more relevant to the user's interests.

At 810, system 100 may transform received event data into a training data format. As described above, the event data may indicate when a user interacts with a presented UI element or fails to interact with the presented UI element. The event data may be batched and/or otherwise compiled over a period of time. Each entry therein may be labeled with recommending ML model or other identifier associated with the instance in which the UI element was displayed. The entry may include a reward value, such as 1 for click, 0 for no click, the value of the interaction, an amount of time associated with the interaction, etc. To transform the data, system 100 may write the data into a specific format tailored for the training algorithm, based on known transformation techniques including pre-processing, creating a table with reward column and features columns, scaling features, encoding categorical features to numerical features. In implementations in which a library, such as vowpalwabbit, is used for training, the data may be transformed by writing the data into a specific format tailored for the library.

At 820, system 100 may re-train the contextual bandit ML model on the training data from 810. For example, system 100 can use standard ML training procedures where all parameters are updated in one training process and/or can use online learning procedures wherein each parameter of the contextual bandit ML model is trained and updated one by one with multiple training passes. In some implementations, the oracle within the contextual bandit ML model is trained. In some implementations, the exploration algorithm may additionally be trained, for example, by modifying the epsilon parameter.

At 830, system 100 may deploy the re-trained contextual bandit ML model. For example, the contextual bandit ML model may be stored in memory of system 100 and/or a machine learning platform (e.g., a component of system 100, a separate component accessible to system 100, a cloud-based service, etc.). When process 300 is run again in response to a request payload being received, the re-trained contextual bandit ML model will have been further refined and may therefore select a ML model that is more likely to recommend content that is relevant to the user.

Figure 9:
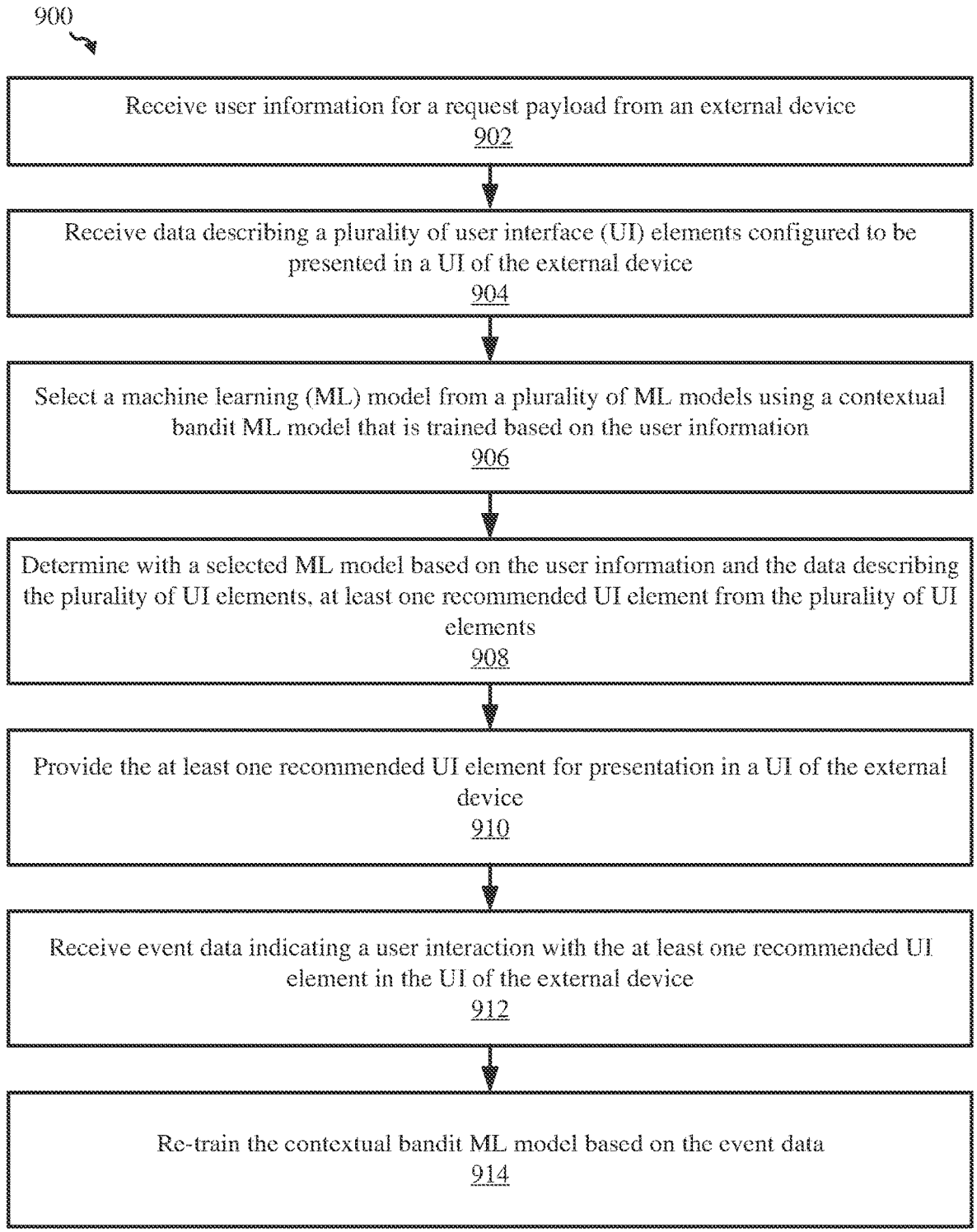
FIG. 9 shows an example flow chart illustrating a computer-implemented method for content delivery according to some implementations.

FIG. 9 shows a flow chart illustrating a computer-implemented method 900 for delivery of content, according to some implementations. The method 900, for example, may perform one or more aspects of process 300 shown in FIG. 3, including any one or more of the processes 400-800 shown in FIGS. 4-8, and may be performed by processor in the ML content delivery system 100 shown in FIG. 1 and/or computer system 200 shown in FIG. 2.

At 902, the method may include receiving user information for a request payload from an external device, e.g., as described at 310 in FIG. 3, which may be performed by the featurization processor 110 discussed in FIG. 1 or the interface 210 and the at least processor 230 operating in accordance with the input feature/content data instructions 253 stored in computer-readable medium 250 discussed in FIG. 2. The user information, for example, may include a user identifier and may further include context data, such as a time stamp, a location of the external device, an identification of apps running on the external device, an identification of an app used to send the request payload, etc.

At 904, the method may include receiving data describing a plurality of user interface (UI) elements configured to be presented in a UI of the external device, e.g., as described at 330 in FIG. 3, which may be performed by the recommendations processor 120 discussed in FIG. 1 or the database 220 and the at least processor 230 operating in accordance with the input feature/content data instructions 253 stored in computer-readable medium 250 discussed in FIG. 2. The data describing the UI elements, for example, may be content feature vectors, e.g., as discussed in reference to FIG. 5. For example, if the content feature vectors may describe information relevant to the content, such the type, subject matter, length, etc.

At 906, the method includes selecting a machine learning (ML) model from a plurality of ML models using a contextual bandit ML model that is trained based on the user information, e.g., as described at 340 in FIG. 3 and in contextual bandit process 600 in FIG. 6, which may be performed by the contextual bandit processor 115 discussed in FIG. 1 or the at least processor 230 operating in accordance with the contextual bandit instructions 254 stored in computer-readable medium 250 discussed in FIG. 2. In one implementation, for example, the plurality of ML models may include at least one of: different types of ML models, ML models of a same type but different hyperparameters (e.g., such as complexity of the model, number of nodes, leaves, depth, weights, biases), ML models of a same type but that use different sets of input features, or any combination thereof.

At 908, the method includes determining with a selected ML model based on the user information and the data describing the plurality of UI elements, at least one recommended UI element from the plurality of UI elements, e.g., as described at 350 in FIG. 3 and in recommendation process 700 in FIG. 7, which may be performed by the recommendation processor 120 discussed in FIG. 1 or the at least processor 230 operating in accordance with the multiple ML models instructions 255 stored in computer-readable medium 250 discussed in FIG. 2.

At 910, the method includes providing the at least one recommended UI element for presentation in a UI of the external device, e.g., as described at 350 in FIG. 3 and in recommendation process 700 in FIG. 7, which may be performed by the recommendation processor 120 discussed in FIG. 1 or the at least processor 230 operating in accordance with the multiple ML models instructions 255 stored in computer-readable medium 250 discussed in FIG. 2.

At 912, the method includes receiving event data indicating a user interaction with the at least one recommended UI element in the UI of the external device, e.g., as described at 370 in FIG. 3 and in training process 800 in FIG. 8, which may be performed by the update processor 130 discussed in FIG. 1 or the at least processor 230 operating in accordance with the update instructions 256 stored in computer-readable medium 250 discussed in FIG. 2.

At 914, the method includes re-training the contextual bandit ML model based on the event data, e.g., as described at 380 in FIG. 3 and in training process 800 in FIG. 8, which may be performed by the update processor 130 discussed in FIG. 1 or the at least processor 230 operating in accordance with the update instructions 256 stored in computer-readable medium 250 discussed in FIG. 2.

In one implementation, the method may further include generating at least one input feature vector based on the user information, where the contextual bandit ML model selects the selected ML model based on the user information using at least one input feature vector, and the selected ML model determines the at least one recommended UI element based on the user information using the at least one input feature vector, e.g., as described at 330 in FIG. 3 and input feature vector generation process 400 described in FIG. 4, which may be performed by the database 220 and the at least processor 230 operating in accordance with the input feature/content data instructions 253 stored in computer-readable medium 250 discussed in FIG. 2. The at least one input feature vector may be further based on contextual data related to the request payload, e.g., as described at 320 in FIG. 3 and input feature vector generation process 400 in FIG. 4. In some implementations, the contextual bandit ML model may use a first input feature vector that is generated based on a first set of user information and the selected ML model may use a second input feature vector that is generated based on a second set of user information that is different than the first set of user information, e.g., as described at 320 in FIG. 3 and input feature vector generation process 400 in FIG. 4.

In one implementation, the contextual bandit ML model may select the selected ML model by estimating a respective current reward value for each of the plurality of ML models, e.g., as described at 340 in FIG. 3 and at 620 of the contextual bandit process 600 in FIG. 6; and by applying an explore-exploit algorithm to select the selected ML model according to the current reward value, e.g., as described at 340 in FIG. 3 and at 630 and 640 of the contextual bandit process 600 in FIG. 6. By way of example, the explore-exploit algorithm may be one of a softmax algorithm and an epsilon-greedy algorithm, e.g., as described at 630 and 640 of the contextual bandit process 600 in FIG. 6.

In one implementation, the event data indicating the user interaction may indicate a reward value associated with the selected ML model based on the user interaction with at least one recommended UI element, e.g., as described at 370 in FIG. 3 and in training process 800 in FIG. 8.

In one implementation, the re-training may include generating training data based on the reward value associated with the selected ML model, e.g., as described at 370 in FIG. 3 and in training process 800 in FIG. 8; and re-training the contextual bandit ML model based on the training data, e.g., as described at 370 in FIG. 3 and at 820 in training process 800 in FIG. 8.

As used herein, a phrase referring to "at least one of" or "one or more of" or a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for delivery of content, comprising:
    training, by at least one processor, a contextual bandit machine learning (ML) model based on user information to select at least one ML model from a plurality of ML models, wherein each ML model in the plurality of ML models is configured to select one or more user interface (UI) elements from a plurality of UI elements to be presented to users based on the user information, and the contextual bandit ML model is configured to select the at least one ML model that is most likely to select UI elements with which a user will interact;
    receiving, by the at least one processor, user information for a request payload from an external device associated with a user;
    receiving, by the at least one processor, data describing a plurality of UI elements configured to be presented in a UI of the external device;
    selecting, by the at least one processor, with the contextual bandit ML model based on the user information, an ML model from the plurality of ML models to determine at least one UI element from the plurality of UI elements to recommend to the user;
    determining, by the at least one processor, with a selected ML model based on the user information and the data describing the plurality of UI elements, at least one recommended UI element from the plurality of UI elements to present to the user;
    providing, by the at least one processor, the at least one UI element for presentation in a UI of the external device associated with the user;
    receiving, by the at least one processor, event data indicating whether the user interacted with the at least one recommended UI element in the UI of the external device; and
    re-training, by the at least one processor, the contextual bandit ML model based on the event data to increase a probability of selecting the selected ML model based on the user information in response to an indication that the user interacted with the at least one UI element and to increase a probability of selecting a different ML model based on the user information in response to an indication that the user did not interact with the at least one UI element.

2. The method of claim 1, further comprising generating, by the least one processor, at least one input feature vector based on the user information, wherein the contextual bandit ML model selects the selected ML model based on the user information using at least one input feature vector, and wherein the selected ML model determines the at least one recommended UI element based on the user information using the at least one input feature vector.

3. The method of claim 2, wherein the at least one input feature vector is further based on contextual data related to the request payload.

4. The method of claim 2, wherein the contextual bandit ML model uses a first input feature vector that is generated based on a first set of user information and the selected ML model uses a second input feature vector that is generated based on a second set of user information that is different than the first set of user information.

5. The method of claim 1, wherein the contextual bandit ML model selects the selected ML model by:
    estimating a respective current reward value for each of the plurality of ML models; and
    applying an explore-exploit algorithm to select the selected ML model based on the current reward value.

6. The method of claim 5, wherein the explore-exploit algorithm is one of a softmax algorithm and an epsilon-greedy algorithm.

7. The method of claim 1, wherein the plurality of ML models comprises at least one of: different types of ML models, ML models of a same type but that use different hyperparameters, ML models of a same type but that use different sets of input features, or any combination thereof.

8. The method of claim 1, wherein the event data indicating the user interaction indicates a reward value associated with the selected ML model based on the user interaction with the at least one recommended UI element.

9. The method of claim 8, wherein the re-training comprises:
    generating training data based on the reward value associated with the selected ML model; and
    re-training the contextual bandit ML model based on the training data.

10. A system configured for delivery of content, comprising:
    a user feature database;
    a user interface (UI) element database; and
    a processor in communication with the user feature database and the UI element database and configured to communicate with an external device through at least one network, the processor being configured to perform processing comprising:
    train a contextual bandit machine learning (ML) model based on user information to select at least one ML model from a plurality of ML models, wherein each ML model in the plurality of ML models is configured to select one or more user interface (UI) elements from a plurality of UI elements to be presented to users based on the user information, and the contextual bandit ML model is configured to select the at least one ML model that is most likely to select UI elements with which a user will interact;
    receive user information for a request payload from the external device associated with a user;
    receive data describing a plurality of UI elements configured to be presented in a UI of the external device;
    select with the contextual bandit ML model based on the user information, an ML model from the plurality of ML models to determine at least one UI element from the plurality of UI elements to recommend to the user;
    determine with a selected ML model based on the user information and the data describing the plurality of UI elements, at least one recommended UI element from the plurality of UI elements to present to the user;
    provide the at least one UI element for presentation in a UI of the external device associated with the user;
    receive event data indicating whether the user interacted with the at least one recommended UI element in the UI of the external device; and
    re-train the contextual bandit ML model based on the event data to increase a probability of selecting the selected ML model based on the user information in response to an indication that the user interacted with the at least one UI element and to increase a probability of selecting a different ML model based on the user information in response to an indication that the user did not interact with the at least one UI element.

11. The system of claim 10, wherein the processor is further configured to perform processing comprising generate at least one input feature vector based on the user information, wherein the contextual bandit ML model selects the selected ML model based on the user information using at least one input feature vector, and wherein the selected ML model determines the at least one recommended UI element based on the user information using the at least one input feature vector.

12. The system of claim 11, wherein the at least one input feature vector is further based on contextual data related to the request payload.

13. The system of claim 11, wherein the contextual bandit ML model uses a first input feature vector that is generated based on a first set of user information and the selected ML model uses a second input feature vector that is generated based on a second set of user information that is different than the first set of user information.

14. The system of claim 10, wherein the processor is configured to select the selected ML model using the contextual bandit ML model by being configured to perform processing comprising:
estimate a respective current reward value for each of the plurality of ML models; and
apply an explore-exploit algorithm to select the selected ML model based on the current reward value.

15. The system of claim 14, wherein the explore-exploit algorithm is one of a softmax algorithm and an epsilon-greedy algorithm.

16. The system of claim 10, wherein the plurality of ML models comprises at least one of: different types of ML models, ML models of a same type but that use different hyperparameters, ML models of a same type but that use different sets of input features, or any combination thereof.

17. The system of claim 10, wherein the event data indicating the user interaction indicates a reward value associated with the selected ML model based on the user interaction with the at least one recommended UI element.

18. The system of claim 17, wherein the processor is configured to re-train the contextual bandit ML model by being configured to perform processing comprising:
generate training data based on the reward value associated with the selected ML model; and
re-train the contextual bandit ML model based on the training data.

19. A system configured for delivery of content, comprising:
a featurization processor configured to receive user information for a request payload from an external device;
a contextual bandit processor configured to receive the user information from the featurization processor and to select a machine learning (ML) model from a plurality of ML models using a contextual bandit ML model that is trained based on the user information, wherein each ML model in the plurality of ML models is configured to select one or more user interface (UI) elements from a plurality of UI elements to be presented to users based on the user information, and the contextual bandit ML model is configured to select the ML model that is most likely to select UI elements with which a user will interact;
a recommendation processor configured to receive data describing a plurality of user interface (UI) elements configured to be presented in a UI of the external device and to determine with a selected ML model based on the user information and the data describing the plurality of UI elements, at least one recommended UI element from the plurality of UI elements and to provide the at least one recommended UI element for presentation in a UI of the external device; and
an update processor configured to train the contextual bandit ML model based on user information to select the ML model from the plurality of ML models, receive event data indicating whether a user interacted with the at least one recommended UI element in the UI of the external device, and to re-train the contextual bandit ML model based on the event data to increase a probability of selecting the selected ML model based on the user information in response to an indication that the user interacted with the at least one UI element and to increase a probability of selecting a different ML model based on the user information in response to an indication that the user did not interact with the at least one UI element.

20. The system of claim 19, wherein the event data indicating the user interaction indicates a reward value associated with the selected ML model based on the user interaction with the at least one recommended UI element and wherein the update processor is configured to re-train the contextual bandit ML model by being configured to:
generate training data based on the reward value associated with the selected ML model; and
re-train the contextual bandit ML model based on the training data.

* * * * *